United States Patent [19]

Tohyama et al.

[11] 4,352,561
[45] Oct. 5, 1982

[54] CALIBRATING APPARATUS IN A MONOCHROMATOR

[75] Inventors: Shigeo Tohyama; Nobuo Akitomo; Isao Nemoto, all of Katsuta, Japan

[73] Assignee: Hitachi, Ltd., Tokyo, Japan

[21] Appl. No.: 192,530

[22] PCT Filed: Jun. 20, 1979

[86] PCT No.: PCT/JP79/00158
§ 371 Date: Feb. 25, 1980
§ 102(e) Date: Feb. 25, 1980

[87] PCT Pub. No.: WO80/00189
PCT Pub. Date: Feb. 7, 1980

[30] Foreign Application Priority Data

Jun. 23, 1978 [JP] Japan .................................. 53-75350

[51] Int. Cl.³ .............................. G01J 3/12; G01J 3/18
[52] U.S. Cl. ..................................... 356/332; 356/334
[58] Field of Search ........................ 356/332, 333, 334

[56] References Cited

U.S. PATENT DOCUMENTS 4,203,669 5/1980 Maeda et al. ........................ 356/332

Primary Examiner—Vincent P. McGraw
Attorney, Agent, or Firm—Antonelli, Terry & Wands

[57] ABSTRACT

This invention relates to an apparatus for calibrating a slit width among calibrating apparatuses in a monochromator.

There has been the problem that, although the slit width precision of the monochromator has been an important performance item, the calibration of the slit width has not hitherto been performed.

This invention employs a bright-line spectrum or zero-order light for the slit width calibration. A peak is found out from among output signals of a lightdetector (20) by means of a peak decision unit (26). The peak value is stored into a memory (28). This peak value and the output of the lightdetector (20) are compared by a comparator (32). The slit width is calibrated on the basis of the quantity of wavelength scanning till the coincidence of both the values.

12 Claims, 6 Drawing Figures

CALIBRATING APPARATUS IN A MONOCHROMATOR

DESCRIPTION

TECHNICAL FIELD

This invention relates to an apparatus for calibrating the slit width etc. of a monochromator.

BACKGROUND ART

In a spectrophotometer, the wavelength precision and the slit width precision of a monochromator are the most important performance items which determine the characteristics of the instrument. Particularly in high-class instruments, they must be adjusted to theoretical limits in structure and in mechanism. On the other hand, in case where they have been adjusted to the limits in this manner, the adjusting mechanisms need to have especially stout structures so as to endure vibrations during transportation and also fluctuations with the lapse of time.

In any of conventional spectrophotometers, however, wavelength driving means and slit driving means have been operated by mechanical coupling portions, thereby to adjust the wavelength and the slit width.

More specifically, the wavelength is adjusted by a wavelength adjuster which is coupled to a wavelength counter of a wavelength pickup mechanism. The slit width is associated with a slit width indicating panel, and in general, the calibration of the slit width after assemblage has been difficult. Accordingly, there has been the problem that when the mechanism systems shift or have their positions slightly moved during transportation or with the lapse of time, the deviations directly affect the wavelength precision and the slit width, to lower the precision of the spectrophotometer.

As a device for eliminating such problem and for facilitating the calibration of the wavelength of the monochromator, the Applicant has already proposed a monochromator wavelength reading device in Japanese Patent Application No. 50-126906. This device sets a wavelength counter at a fixed count value by the use of a wavelength calibrating pulse signal which appears when the tuned wavelength of the monochromator has become a certain predetermined wavelength $\lambda_c$, whereby the count value of the wavelength counter is calibrated to the value corresponding to the tuned wavelength of the monochromator.

More concretely, in a wavelength driving device of the sign bar system, a slider which moves on a feed screw is provided with a pawl. When the tuned wavelength $\lambda$ of the monochromator has become the predetermined wavelength $\lambda_c$, that is, when the movement distance x of the slider has become $x = x_c$, the pawel actuates a switch. The actuation signal of the switch is fed to the wavelength counter as the wavelength calibrating pulse signal, to set the count value of the wavelength counter at the fixed value corresponding to $\lambda_c$. According to the monochromator wavelength reading device, the count value of the wavelength counter is automatically calibrated by the wavelength calibrating pulse signal each time the tuned wavelength of the monochromator becomes $\lambda_c$ to actuate the switch. Therefore, the device has the feature that the count value of the wavelength counter can be automatically calibrated even in case where it has deviated by any cause, for example, that a pulse motor does not operate following up a pulse from a motor driving circuit.

With such calibration based on the wavelength calibrating signal-generator coupled to the feed screw or a gearing, however, there has been the problem that calibrations are impossible for wavelength deviations caused principally by the optical system of the monochromator, for example, by the deviation of an angle defined between a light dispersing element and a lever. As an expedient for wavelength calibrations with such causes taken into account, the Applicant has already proposed in Japanese Patent Application No. 50-126906 a method of calibrating the wavelength by the use of a calibrating light source which emits a known line spectrum. This method needs to additionally dispose the calibrating light source and a sub-detector in an ordinary monochromator, to monitor the line spectrum of the calibrating light source by means of the sub-detector and to separately calibrate the indication of the wavelength counter with an output signal of the sub-detector, and it has had the problem that the optical system of the apparatus becomes complicated. There has also been the problem that, in either of these apparatuses, the slit width calibration cannot be made at all.

DISCLOSURE OF THE INVENTION

An object of this invention is to provide a calibrating apparatus in a monochromator capable of calibrating a slit width.

Another object of this invention is to provide a calibrating apparatus in a monochromator capable of calibrating the deviation between an actual slit width and a slit width to be indicated as is ascribable to an optical system.

Still another object of this invention is to provide a calibrating apparatus in a monochromator capable of calibrating a slit width to the optimum degree.

This invention consists in calibrating a slit width on the basis of the quantity of wavelength scanning up to the time when the ratio between a value of a predetermined peak of a spectrum and a value varying with the wavelength scanning becomes a fixed magnitude.

BEST MODE FOR CARRYING OUT THE INVENTION

Figure 1:
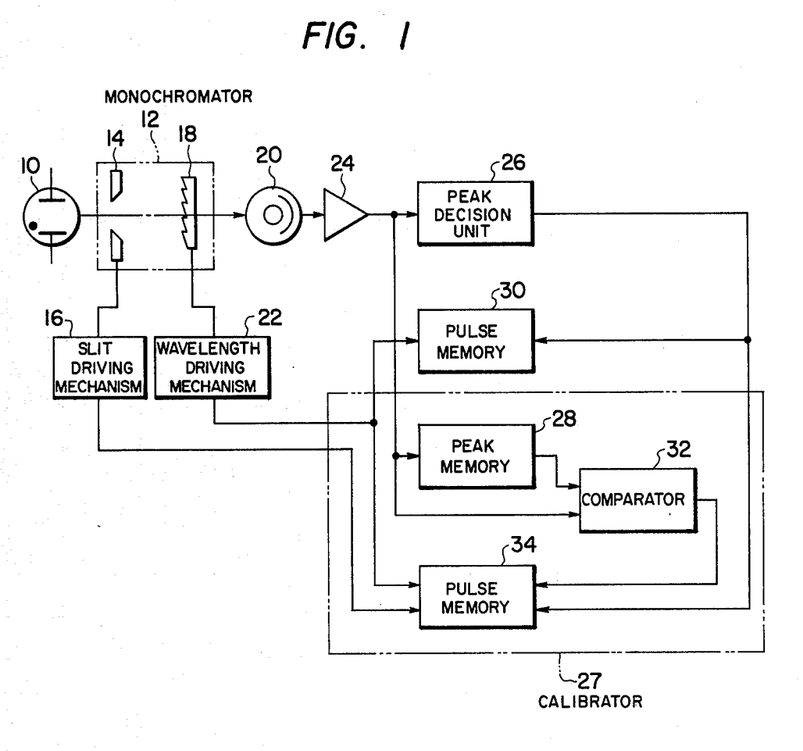
FIG. 1 is a block diagram of an embodiment of this invention.

The outline of an embodiment of this invention will be described with reference to FIG. 1. A light source 10 may be one having a bright-line spectrum, or one not having it. Known as light sources having bright-line spectra are a mercury lamp, a hollow cathode lamp, a xenon lamp, a deuterium lamp, etc. Usually, light sources other than them do not have bright-line spectra. In spectrophotometers for ultraviolet and visible regions, the deuterium lamp is especially effective. The reason is that the deuterium lamp has an intense continuous spectrum in an ultraviolet region of 200 nm to 300 nm and has therefore been employed as a general light source, and that it has a bright-line spectrum at 656.1 nm within a region which is not ordinarily used. The light source 10 may well be a light source which does not especially have a bright-line spectrum. In case of such a light source, zero-order light can be utilized as will be stated later. Light emitted from the light source 10 is introduced into a monochromator 12 from an entrance slit 14 of the monochromator. The slit width of the entrance slit 14 can be varied by a slit driving mechanism 16. The light having entered from the entrance slit 14 is dispersed by a light dispersing element 18 such as diffraction grating and prism. Light of a specified wavelength in the dispersed light emerges from an exit slit (not shown), and is converted into an electric signal by a lightdetector 20. Ordinarily, the entrance slit and the exit slit are interlocked and are driven by a single slit driving mechanism 16. The light dispersing element 18 is driven by a wavelength driving mechanism 22, whereby wavelengths are scanned. As the slit driving mechanism 16 and the wavelength driving mechanism 22, ones of various forms have been known. These mechanisms are exemplified in, for example, the specification of U.S. Pat. No. 3,098,408, the specification of U.S. Pat. No. 3,868,499 and the specification of Japanese Patent Application No. 50-126906 already filed by the Applicant of the present case. The slit driving mechanism and the wavelength driving mechanism generate pulses corresponding to respective displacements, by employing pulse motors and encoders. A preamplifier 24 amplifies an output of the lightdetector 20. A peak decision unit 26 seeks a peak position in an output of the preamplifier 24. A memory 28 in slit width calibrating means 27 stores therein the output of the preamplifier 24 at the moment when the peak decision unit 26 has decided the peak. A pulse memory 30 similarly stores therein as the bright-line wavelength position of the light source 10, the scanning position of the wavelength driving mechanism 22 at the time when the peak decision unit 26 has decided the peak. A comparator 32 compares ½ of the value stored in the memory 28 and the output of the preamplifier 24 varying every moment in accordance with the wavelength scanning, and becomes operative upon detecting that both have become equal. A pulse memory 34 stores therein the number of pulses supplied from the wavelength driving mechanism 22 in the period from the moment of the decision of the peak by the peak decision unit 26 to the moment of the operation of the comparator 32.

Hereunder, the operation will be described. The light emitted from the light source 10 having the bright-line spectrum is turned into monochromatic light by the entrance slit 14 and the light dispersing element 18, the monochromatic light is converted into the electric signal by the lightdetector 20, and the electric signal is amplified by the preamplifier 24. The peak decision unit 26 seeks the peak position of the output of the preamplifier 24. Meantime, the light dispersing element 18 is being continuously scanned by the wavelength driving mechanism 22. When the peak decision unit 26 has decided the peak, the monochromator is just coincident with the bright-line spectrum wavelength. Therefore, the position of the wavelength corresponding to the peak is stored into the pulse memory 30 as being the position of the wavelength (bright-line wavelength) having been stored in advance, and wavelengths are read out with reference to this position.

On the other hand, when the peak decision unit 26 has decided the peak, the output of the preamplifier 24 at the instant is stored into the memory 28. When the output of the preamplifier 24 and the value of ½ of the value stored in the memory 28 have become equal, a signal is derived from the comparator 32. The number of feed pulses of the wavelength driving mechanism 22 advanced in the period from the moment of the decision of the peak by the peak decision unit 26 to the moment of the operation of the comparator 32 is stored by the pulse memory 34. This number of pulses stored corresponds to the displacement of the slit driving mechanism 16 which drives the entrance slit 14. Accordingly, the number of pulses stored by the above procedure can be directly deemed to correspond to the slit width.

The above scanning is automatically executed by the spectrophotometer immediately after energization each time the spectrophotometer is energized. Accordingly, the wavelength calibration and the slit width calibration are carried out each time of the use of the spectrophotometer by employing the bright-line spectrum of the measuring light source, so that a slight deviation during transportation and a change with the lapse of time after use over a long term become negligible.

Figure 2:
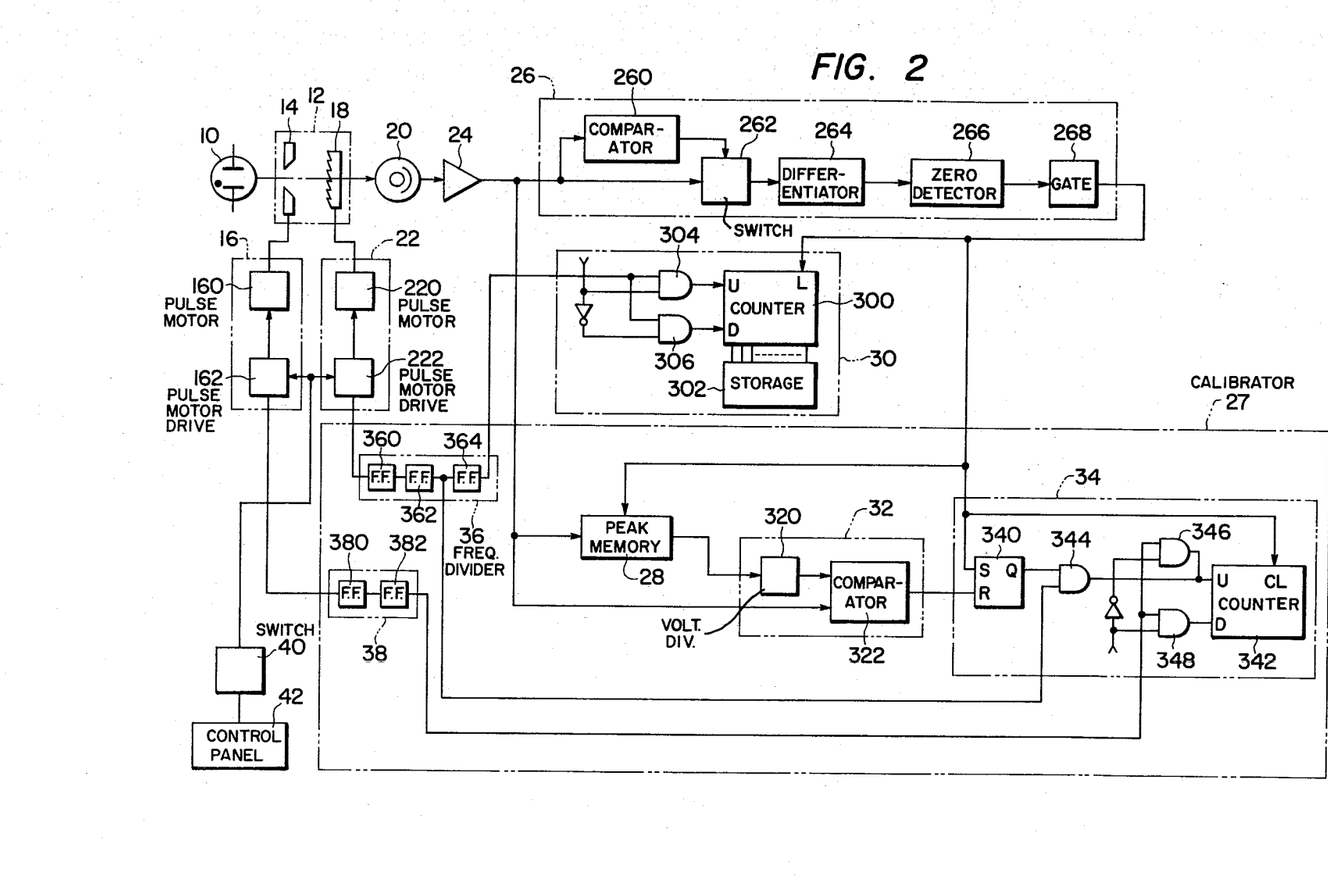
FIG. 2 is a detailed block diagram of an embodiment of this invention.

Now, the first embodiment thus far described will be explained more in detail with reference to FIG. 2. The entrance slit 14 is driven by a slit width-adjusting pulse motor 160 of the slit driving mechanism 16, while the light dispersing element 18 is driven by a wavelength driving pulse motor 220 of the wavelength driving mechanism 22. The pulse motors 160 and 220 are respectively controlled by pulse motor-driving devices 162 and 222. As the pulse motor-driving device, various ones have been known, and there is, for example, one in Japanese Patent Application No. 51-104863 already proposed by the Applicant.

The output of the preamplifier enters a comparator 260 of the peak decision unit 26. The comparator 260 provides an output when the output of the preamplifier 24 is greater than a predetermined level. This comparator 260 is employed in order to prevent the peak decision unit 26 from operating erroneously due to noise in the output of the preamplifier 24. A switch 262 is turned "on" by the signal of the comparator 260, to put the output of the preamplifier 24 into a differentiator 264. Whether or not the output of the preamplifier is the peak can be discriminated depending upon whether or not the differentiated value of the input signal is zero. Accordingly, the output of the differentiator 264 is applied to a zero detector 266. The zero detector 266 provides a coincidence signal when the input signal has become zero. The coincidence signal is converted into an analog gate signal in a gate circuit 268. The output signal of the peak decision unit 26 is applied to a load terminal L of a presetable up/down counter 300 in the pulse memory 30. On the other hand, a pacular value storage circuit 302 is connected to a preset input of the counter 300. Accordingly, the moment the peak has been decided in the peak decision unit 26, the content of the pacular value storage circuit 302 is set into the counter 300 by the output signal of the peak decision unit 26. Here, in case where the light source 10 having the bright-line spectrum is the deuterium lamp, the wavelength of the bright-line spectrum is 656.1 nm. On the other hand, the variation of wavelengths by pulses generated from the pulse motor-driving device 222 is 0.0125 nm/pulse. The output pulses of the pulse motor-driving device 222 have their frequency divided by means of a frequency divider 36. The frequency divider 36 is constructed of three stages of flip-flops 360, 362 and 364. The resulting pulses after the frequency division by eight are applied to the counter 300 of the pulse memory 30. In the counter 300, accordingly, one pulse is counted for eight output pulses of the pulse motor-driving device 222. Here, a BCD counter of five digits is used as the counter 300. On the other hand, a logic in the form of the BCD code of "6561" is assembled in the paculiar value storage circuit 302 hardware-wise. Accordingly, when the preset input has been made into the counter 300, "6561" is set in the counter 300. By connecting a decoder/driver of seven segments to an output terminal of the counter 300, the content of the counter 300 can be indicated as the wavelength value. Meanwhile, when the wavelength scanning has been made, the pulses after the frequency division by eight enter an "up" input or "down" input of the counter 300 via either an AND gate 304 or 306, and the content of the counter 300 varies in interlocking with the wavelength scanning. Either of the AND gates 304 and 306 is selected with either of signals "1" and "0" which distinguish the forward rotation and reverse rotation of the wavelength scanning. The paculiar value storage circuit 302 may well have its content made variable by employing a digital switch or the like.

In addition, the output signal of the peak decision unit 26 is applied to the pulse memories 30 and 34. The signal applied to the pulse memory 34 sets a flip-flop 340, and simultaneously clears a content of an up/down counter 342. When the flip-flop 340 has been set, an AND gate 344 falls into the "on" state. The other input of the AND gate 344 receives pulses from the pulse motor-driving device 222 subjected to a frequency division by four by means of the frequency divider 36. The pulses having passed through the AND gate 344 are applied to an "up" input of the counter 342 and are counted. Meanwhile, the peak memory 28 stores the peak value by the use of the output signal of the peak decision unit 26. As the peak memory 28, a sample holding circuit can be employed. In case where the output signal of the peak decision unit 26 is not utilized, a peak value-detecting circuit can be employed. The value held in the peak memory 28 is subjected to a voltage division by two by means of a voltage divider circuit 320, and then enters one input of a comparator 322. The other input of the comparator 322 receives the output of the preamplifier 24 varying with the wavelength scanning. The flip-flop 340 is reset by the output signal of the comparator 322 at the instant when the two inputs of the comparator have become equal. Accordingly, the AND gate 344 falls into the "off" state, and the counting of the counter 322 ceases. The content of the counter at this time is the quantity of wavelength scanning from the position of the peak to ½ of the peak value, and this value is the quantity corresponding to ½ of the half-width of the spectrum. Here, in case where the quantity of wavelength scanning is 1 nm, the number of pulses generated by the pulse motor-driving circuit 222 is 80. Accordingly, the number of output pulses of the frequency divider 36 becomes 20, and the content of the counter 342 becomes "20". Assuming the counter 342 to be a BCD up/down counter, the indication of "2.0 nm" can be readily obtained by employing a 7-segment decoder/driver and shifting the position of a decimal point. In the above description, the quantity of wavelength scanning is 1.0 nm, and the half-width of the spectrum at this time is 2.0 nm. Accordingly, the indicated content directly represents the slit width. Here, regarding ordinary indications of slit widths, two ways have been known. The first is to indicate a slit width itself in mm, and the second is to indicate a band pass in nm. Both these indications are in a proportional relation, and by way of example, 6.2 nm corresponds to 4 mm. In general, the indication of the band pass is often used. On the other hand, the variation of the slit width by the pulses generated from the pulse motor-driving device 162 is 0.025 nm/pulse. The pulses generated from the pulse motor-driving device 162 have their frequency divided by four by means of two flip-flops 380 and 382 of a frequency divider 38. The resulting pulses enter the "up" input or "down" input of the counter 342 through either an AND gate 346 or 348. Either of the AND gates 346 and 348 is selected by either of signals "1" and "0" which distinguish the forward rotation and reverse rotation of the slit width variation.

It is desirable that such operations are automatically made before the starting of the manipulation immediately after having energized the spectrophotometer as stated previously. With a switch 40, accordingly, control signals from a control panel 42 are not accepted at all during the time interval from the beginning of the energization to the completion of the calibrating operations.

In the above description, the change of the wavelength by the unit pulse generated from the pulse motor-driving device 222 has been 0.0125 nm/pulse, while the change of the wavelength by the unit pulse generated from the pulse motor-driving device 162 has been 0.025 nm/pulse. However, in case where the change of the wavelength by the unit pulse is 0.025 nm/pulse, the apparatus is similarly operated by connecting an output of the flip-flop 360 of the frequency divider 36 to the AND gate 344 of the memory 34.

In the foregoing embodiment, the comparator 32 seeks the instant when the output of the preamplifier 24 has become ½ of the peak output stored in the memory 28. However, the ratio between the output of the preamplifier 24 and the peak output is not restricted to ½ but can also be made a value other than ½, for example, ¼. More specifically, the shape of the spectrum is bilaterally symmetric with respect to the peak position and is also triangular. Accordingly, the value of ½ times of a spectral width at ¼ of the peak output becomes the band pass. The indication of the band pass can be readily made by adjusting the frequency division ratios of the frequency dividers 36 and 38. Accordingly, any desired ratio can be utilized. From the ordinary concept of the band pass, however, it is desirable to make the ratio ½.

Although, in the foregoing embodiment, the wavelength construction is made on the basis of the peak wavelength of the bright-line spectrum, it can also be made on the basis of zero-order light. More specifically, the zero-order light is not monochromatic light unlike the bright-line spectrum above stated, but it has a peak likewise to the bright-line spectrum. Accordingly, it is also possible to utilize the zero-order light for the wavelength and slit width calibrations. For example, in a spectrophotometer for ultraviolet and visible regions of 200 nm to 900 nm, the position at which the zero-order light appears lies at wavelength 0 nm. Accordingly, the zero-order light can be detected by setting the monochromator near 0 nm. In case of employing the zero-order light for the calibrations, zero may be set in the peculiar value storage circuit 302 in advance. A method for calibrating the slit width may be the same as the foregoing method.

Further, in the foregoing embodiment, the pulse memory 34 is cleared by the gate 268 and is closed by the signal of the comparator 32. However, it is also possible to more enhance the precision by repeating this operation and averaging.

It is also possible that the motion of the wavelength driving pulse motor is reversed, that the number of pulses from the peak wavelength till a wavelength equal to ½ of the peak value on the side opposite to the side in the foregoing embodiment is counted, and that the sum of this number of pulses with the number of pulses according to the first embodiment above described is reckoned as the number of pulses corresponding to the half-width.

It is also allowed that when the output of the preamplifier 24 has become ½ of the peak value, the pulse memory 34 is cleared, simultaneously the motion of the wavelength driving pulse motor being reversed, and that the number of pulses till arrival at ½ of the peak wavelength on the opposite side is counted and is deemed the number of pulses corresponding to the half-width. A circuit arrangement in this case becomes one with the embodiment of FIG. 2 altered slightly. More specifically, supposing that the comparator 322 provides a positive pulse after detecting the coincidence, the flip-flop 340 is omitted. The output of the comparator 322 is directly connected to the clear terminal CL of the counter 342 and the pulse motor-driving circuit 222, and it is connected to one input terminal of the AND gate 344 through an inverter. By the output of the comparator 322, accordingly, the counter 342 is cleared and the pulse motor-driving circuit 222 is caused to generate a reversal signal. Since the reversal of the pulse motor involves a slight time lag, the AND gate 344 is brought into the enabled state by the first coincidence output of the comparator 322, to start the counting. The AND gate 344 is brought into the disabled state by the second coincidence output of the comparator 322, to stop the counting.

In either case, when the number of pulses corresponding to the half-width is counted by the pulse memory 34, the frequency division ratio of the frequency divider 36 connected to the pulse memory 34 needs to be made ½.

Further, in the foregoing embodiment, the slit width calibration and the wavelength calibration are performed immediately after having energized the spectrophotometer. However, the time at which these calibrations are performed is not restricted to that immediately after having energized the spectrophotometer, but they can be performed at will as may be needed.

It is as previously stated that, in the spectrophotometers for ultraviolet and visible regions, the use of the deuterium lamp for the wavelength and slit width calibrations is favorable. Other spectrophotometers will be referred to. A xenon lamp is favorable in a fluorescence spectrophotometer, and a hollow cathode lamp or a mercury lamp is favorable in an atomic absorption spectrophotometer. Each of these lamps has a plurality of bright lines. Accordingly, the bright lines need to be discriminated in case of the calibration. Such discrimination, however, can be readily made by the following methods. First, the reference value of the comparator 260 is made somewhat large. Secondly, the calibration initiating position is determined as in an embodiment of FIG. 4 to be stated later, and the wavelength scanning direction for the calibration is determined into one from the shorter wavelength side to the longer wavelength side or the opposite.

Figure 3:
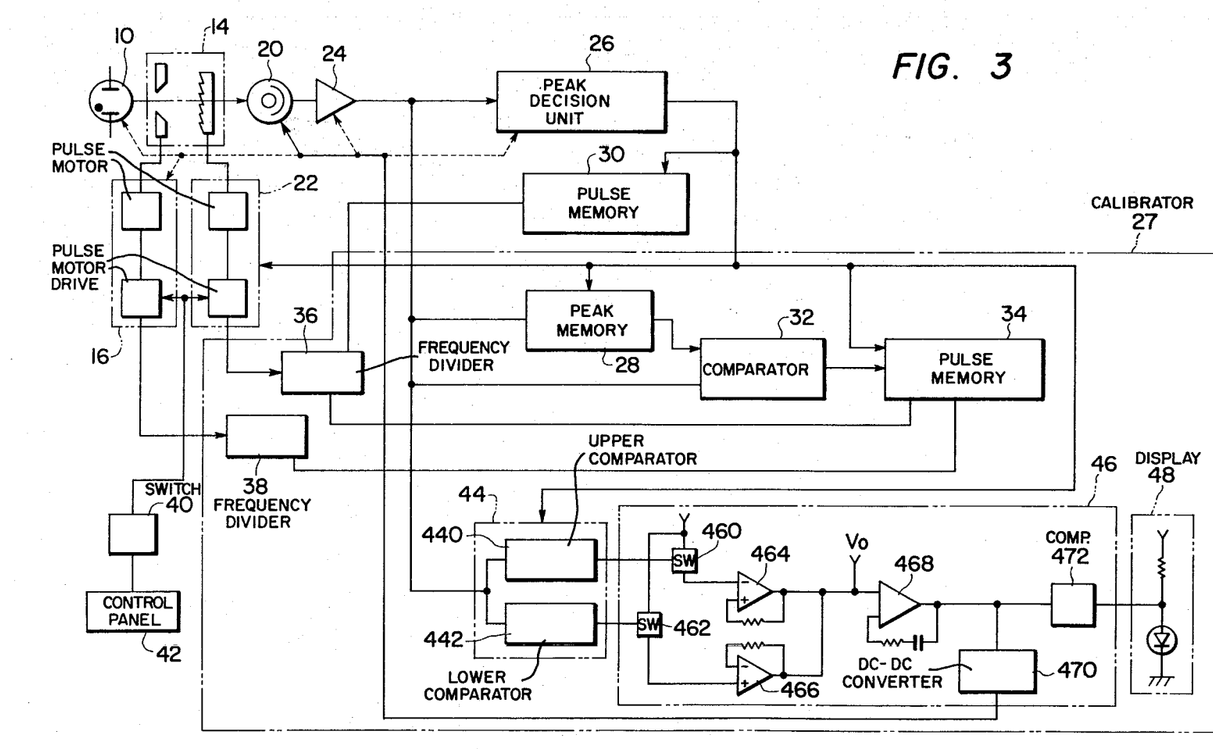
FIG. 3 is a block diagram of another embodiment of this invention.

In any of the foregoing embodiments, it is sometimes the case that the calibrating operation is not performed successfully when the bright-line spectrum is too intense or too weak. An embodiment of this invention having eliminated such disadvantage is shown in FIG. 3. In the same construction as in the preceding embodiment, the present embodiment is further provided with a decision unit 44 which discriminates the magnitude of the output of the preamplifier 24, a gain controller 46 which adjusts the gain of the lightdetector 20 in accordance with an output of the decision unit 44, and a warning display unit 48 which gives warning when the gain controller 46 has raised the gain beyond its upper limit. The remaining construction and the operation of the wavelength calibrating mechanism as well as the slit width-calibrating mechanism are the same as in the preceding embodiment, and are therefore omitted from the description.

In the present embodiment, the signal provided from the preamplifier 24 is also fed to the decision unit 44. The decision unit 44 is actuated by the output signal of the peak decision unit 26, and it is composed of an upper comparator 440 and a lower comparator 442 and constructs, so to speak, a window comparator. The comparator 440 provides a positive signal when the input signal is greater than a predetermined value. The comparator 442 provides a positive signal when the input signal is smaller than a predetermined signal. In case where the output signal of the preamplifier 24 is too intense and where the lightdetector 20 is likely to be saturated, the comparator 440 of the decision unit 44 gives a switch 460 of the gain controller 46 an instruction of lowering the gain. Conversely, in case where the output signal is too weak, an instruction of raising the gain is given to a switch 462 of the gain controller 46. Upon receiving the instruction, the gain controller 46 raises or lowers the gain of the lightdetector 20. When the switch 460 has operated, a predetermined voltage $V_1$ is amplified by an inverting amplifier 464. When the switch 462 has operated, the predetermined voltage $V_1$ is amplified by an amplifier 466, and a sum signal between output signals of the amplifiers 464, 466 and a reference voltage $V_o$ is amplified by a buffer amplifier 468. An output signal of the amplifier 468 is turned by a DC—DC converter 470 into a high voltage, which changes the gain of the lightdetector 20. Further, the output of the preamplifier 24 fluctuates the moment the gain controller 46 has given the instruction, and hence, in order to ignore the fluctuating component, a signal for neglecting the fluctuation is provided from the gain controller 46 to the peak decision unit 26.

In case where the gain controller 46 has raised the gain beyond the upper limit, an overflow signal is automatically provided from a comparator 472. The overflow signal is fed to the warning display unit 48, to display warning for an operator.

Owing to such construction, when the bright-line spectrum is too intense or too weak, the spectrophotometer itself makes the automatic control so as to establish the optimum state as the spectrophotometer. Also in such a case where the light source having the bright-line spectrum is not lit up, the warning is automatically displayed by the warning display unit 48.

In the present embodiment, the gain controller 46 is adapted to electrically adjust the gain of the lightdetector 20. However, it is also possible to adjust the gain of the preamplifier 24 or the applied voltage of the light source 10 and to adjust the quantity of light by controlling the slit width by means of the slit driving mechanism 16.

Figure 4:
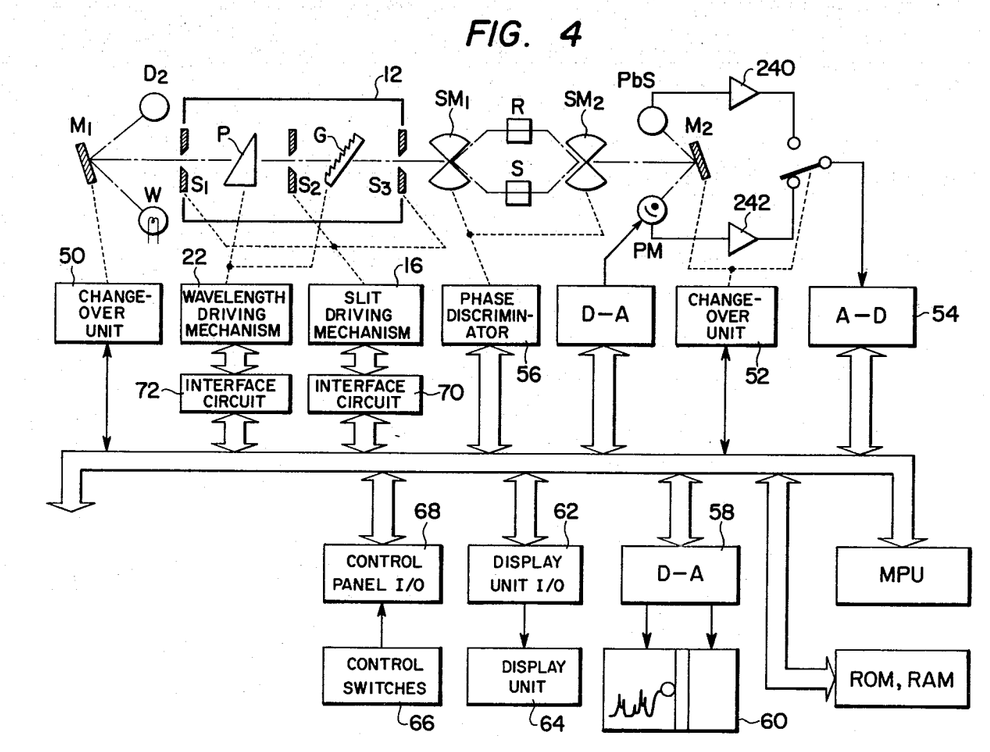
FIG. 4 is a block diagram of still another embodiment of this invention employing a computer.

Although, in the above embodiment, the arithmetic processings are performed for the respective blocks, they can also be executed with a computer. FIG. 4 shows an embodiment of a spectrophotometer according to this invention in which such arithmetic processings by a computer are carried out.

First, the outline of the construction will be explained. The light source consists of a tungsten lamp W and a deuterium lamp $D_2$, which are used by being changed-over with a mirror $M_1$. As the monochromator, a double monochromator which consists of a prism P and a diffraction grating G is constructed. With a microprocessor MPU centered, a program is fixed in a ROM, and a RAM is employed for storing variable data. Wavelengths of the monochromator are scanned in such a way that the prism and the diffraction grating are simultaneously driven by a pulse motor under the control of the computer. Instructions of changing-over optical elements generated on the basis of the wavelength by the computer are transmitted to change-over units 50 and 52 for the light source and detectors, to execute automatic changes-over. As the detectors, a photomultiplier PM is employed for ultraviolet and visible regions, and a PbS photoconductive cell for a near-infrared region. Photometric outputs of the detectors are subjected to an A-D conversion by an A-D converter 54 immediately after having passed through the preamplifier 24. The resulting digital signals are applied to the computer, and are discriminated into and stored as a reference signal R, a sample signal S and a zero signal Z on the basis of a signal of a phase discriminator 56 obtained in synchronism with sector mirrors $SM_1$ and $SM_2$ which split a light beam. From the photometric signals, a transmittance %T is obtained by a digital operation of $(S-Z)/(R-Z)$, or a absorbance is obtained by further subjecting it to a digital Log transformation. It is passed through a 2-channel D-A converter 58 together with a wavelength value, and a spectrum is recorded in an X-Y recorder 60. The reference signal R or the sample signal S is compared with a fixed value stored in the ROM in advance, and a dynode feedback method or a slit servo method through the computer is made so that the value of the signal may become the optimum value. The wavelength or photometric value and other information are indicated on a 7-segment light emitting diode display unit 64 through a display unit I/O 62. States of control switches 66 are read by the computer through a control panel I/O 68.

In the present embodiment, the outputs of the preamplifiers 240 and 242 are subjected to the analog-to-digital conversions by the A/D converter 54, and the respective pulse motors of the wavelength driving mechanism 22 and the slit driving mechanism 16 are controlled by interface circuits 70 and 72. All the wavelength calibrating and slit width calibrating operations explained in the first embodiment are performed by the computer MPU.

Figure 5:
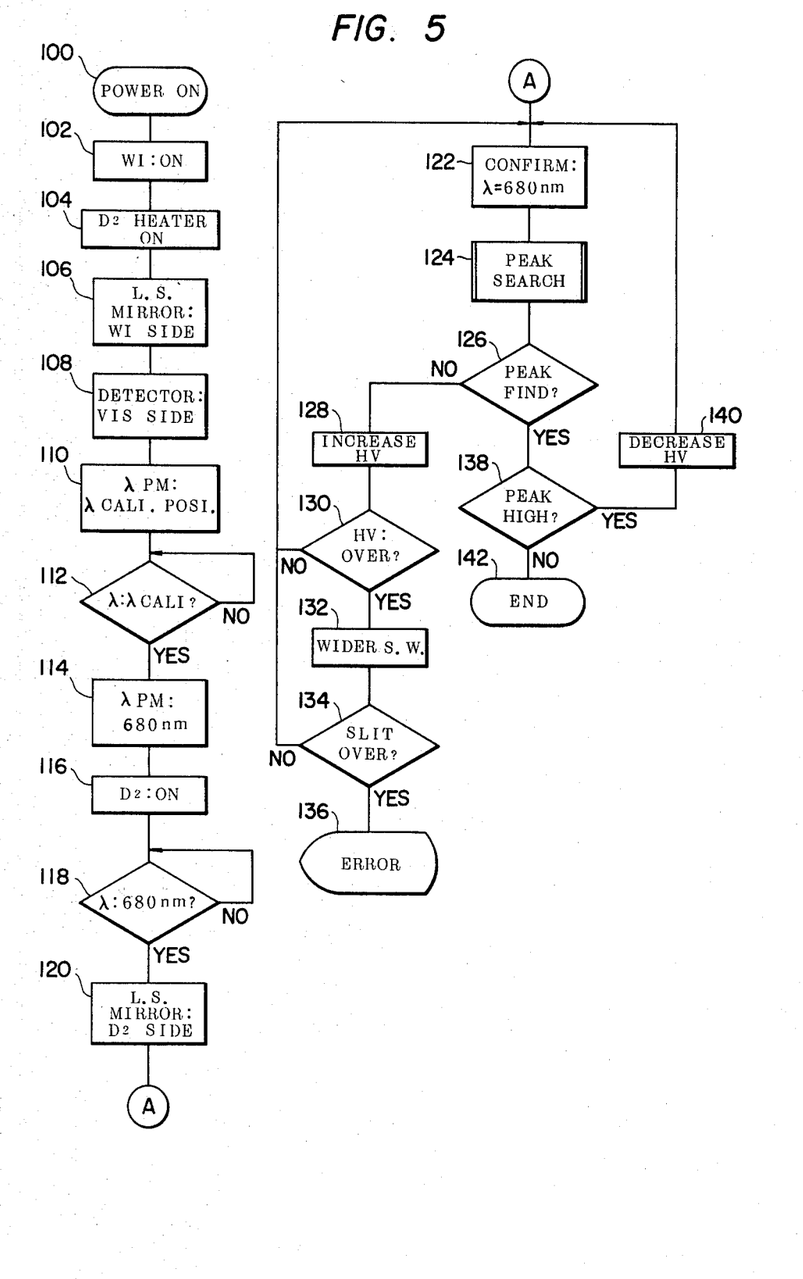
FIGS. 5 and 6 are flow charts of the embodiment in FIG. 4.
Figure 6:
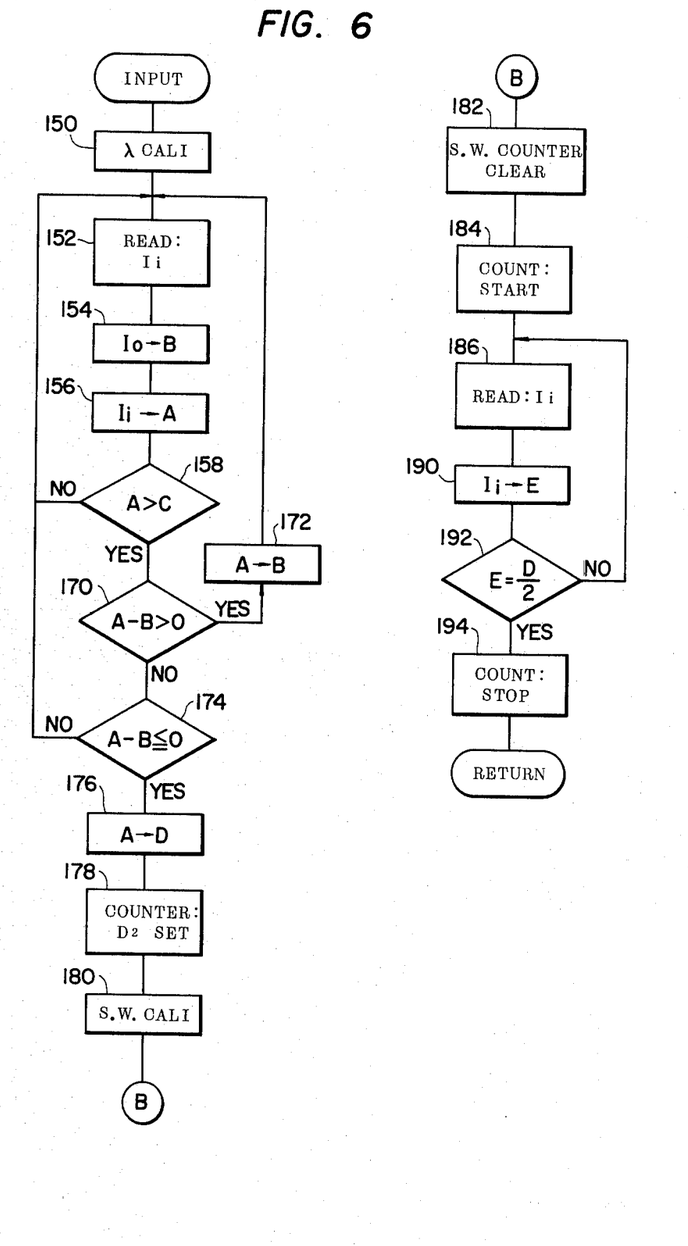

The wavelength calibrating and slit width calibrating operations will be described with reference to flow charts in FIGS. 5 and 6. After a power source has been turned "on" (terminal 100), the heaters of the tungsten lamp WI and the deuterium lamp $D_2$ are turned "on" (processings 102, 104). Thereafter, the light source mirror $M_1$ is changed-over onto the tungsten lamp side (processing 106), and a detector mirror $M_2$ is changed-over onto the visible region side (processing 108). Subsequently, in order to perform a rough adjustment of the wavelength, the pulse motor $\lambda_{PM}$ for the wavelength scanning is driven towards a rough adjustment position (processing 110). The rough adjustment position is set at approximately 920 nm. This wavelength lies on a longer wavelength side of the visible region. The detection of the rough adjustment position is performed with a microswitch or the like. When the rough adjustment has been made in a decision 112, the wavelength scanning pulse motor $\lambda_{PM}$ is subsequently driven to a position of 680 nm (processing 114). This operation is carried out in order to drive the pulse motor to the vicinity of a wavelength calibration position. While this operation is instructed, the deuterium lamp $D_2$ is lit up (processing 116). After the wavelength has been set at 680 nm in a decision 118, the light source mirror $M_1$ is changed-over onto the deuterium lamp $D_2$ (processing 120). After the position of 680 nm has been subsequently confirmed (processing 122), a peak search is executed (processing 124). The peak search will be described later with reference to FIG. 6. When no peak has been found in a decision 126, a high voltage supplied to the photomultiplier PM is increased (processing 128). The excessive increasing of the high voltage is checked in a decision 130, and if there is not an abnormality, the peak search is performed again. In case where the high voltage is greater than a prescribed value, the slit width is expanded (processing 132). The excessive expansion of the slit width is checked in a decision 134, and if there is not an abnormality, the peak search is performed again. In case where the slit width is greater than a prescribed value, there is such an abnormal state that the deuterium lamp $D_2$ has burnt out, and an error is indicated (display 136). In case where the peak has been detected in the decision 126, whether or not the peak value is too large is decided (decision 138). When the peak value is too large, the high voltage is decreased. When it is normal, the calibration ends (terminal 142).

Now, the peak search will be described with reference to FIG. 6. In a processing 150, the wavelength calibration is started. In an input 152, output signals $I_i$ of the lightdetector are sequentially loaded. The first output signal $I_0$ is stored into a memory B (processing 154). The succeeding output signals $I_i$ are stored into a memory A (processing 156). Whether or not the value stored in the memory A is greater than a prescribed value C is decided (decision 158). This decision is made in order to prevent any erroneous detection ascribable to noise. Simultaneously therewith, it signifies the detection of the rise of the peak that the value stored in the memory A is greater than the prescribed value C. Accordingly, the output signals $I_i$ increase monotonously up to the peak value thenceforth. In a decision 170, whether or not the value stored in the memory A later is greater than the value stored in the memory B previously is decided. In case where the value stored in the memory A is greater, it is stored into the memory B (processing 172). In the converse case, there is the possibility that the peak has been detected, and hence, this is confirmed in a decision 174. The value stored in the memory A at this time is the peak value, and is therefore stored into a memory D (processing 176). At the same time, the peak wavelength 656.1 nm of the bright-line spectrum of the deuterium lamp $D_2$ is set in the wavelength counter (processing 178). Subsequently, the calibration of the slit width is performed (processing 180). To this end, the slit width counter is cleared (processing 182). The output signals $I_i$ of the lightdetector are loaded (input 186), and the counting is started (processing 184). The loaded output signals $I_i$ are stored into a memory E (processing 190). In a decision 192, whether or not the value stored in the memory E is ½ of the value stored in the memory D is decided. The coincidence in the decision 192 corresponds to the time when the half-width of the slit width has been detected. Upon the coincidence, the counting stops (processing 194).

What is claimed is:

1. A calibrating apparatus in a monochromator comprising a light source; said monochromator separating into spectral components light emitted from said light source and consisting of an entrance slit, a dispersive element and an exit slit; a lightdetector which detects light dispersed by said monochromator; slit driving means for varying widths of said entrance slit and said exit slit; wavelength driving means for rotating said dispersive element to perform wavelength scanning; means for deciding a predetermined peak of a spectrum from among outputs of said lightdetector as vary with the wavelength scanning by said wavelength driving means; and means for calibrating the slit widths on the basis of a wavelength scanning quantity of said wavelength driving means until a ratio between the output of said lightdetector at said predetermined peak and the outputs thereof varying with the wavelength scanning has become a fixed value.

2. A calibrating apparatus in a monochromator as defined in claim 1, wherein said predetermined peak of said spectrum is a predetermined peak of a bright-line spectrum, and said light source is a light source which emits the bright-line spectrum.

3. A calibrating apparatus in a monochromator as defined in claim 1, wherein said predetermined peak of said spectrum is a peak of a zero-order light, and said dispersive element is a diffraction grating.

4. A calibrating apparatus in a monochromator as defined in claim 1, wherein the peak decision means operates in response to only those of the outputs of said lightdetector which are not less than a predetermined value.

5. A calibrating apparatus in a monochromator as defined in claim 1, wherein each of said slit driving means and wavelength driving means is constructed of a pulse motor and a driving circuit for said pulse motor.

6. A calibrating apparatus in a monochromator as defined in claim 1, wherein each of said slit driving means and wavelength driving means is constructed of a motor and an encoder which operates in interlocking with said motor and which generates a pulse.

7. A calibrating apparatus in a monochromator as defined in claim 1, wherein the slit width calibrating means comprises means for holding the output of said lightdetector with the output signal of the peak decision means, comparison means for providing an output signal when a ratio between the outputs of the holding means and said lightdetector has become a fixed value, and count means for counting pulses generated from said wavelength driving means in accordance with the wavelength scanning, on the basis of the output signal of said comparison means.

8. A calibrating apparatus in a monochromator as defined in claim 7, wherein said count means starts the counting upon said output signal of said peak decision means and stops it upon said output signal of said comparison means.

9. A calibrating apparatus in a monochromator as defined in claim 8, wherein a displacement of a band pass for a unit pulse generated by said slit driving means is double a displacement of a wavelength for a unit pulse generated by said wavelength driving means.

10. A calibrating apparatus in a monochromator as defined in claim 8, wherein a displacement of a band pass for a unit pulse which enters said count means in correspondence with pulses generated by said slit driving means is double a displacement of a wavelength for a unit pulse which enters said count means in correspondence with pulses generated by said wavelength driving means.

11. A calibrating apparatus in a monochromator as defined in claim 7, wherein said slit width calibrating means reverses the wavelength scanning by said wavelength driving means upon a coincidence output of said comparison means, starts the counting of said count means upon a first coincidence output of said comparison means after the reversal, and stops the counting of said count means upon a second coincidence output of said comparison means.

12. A calibrating apparatus in a monochromator as defined in claim 1, wherein the slit width calibrating means comprises means for holding the output of said lightdetector with the output signal of the peak decision means, comparison means for providing an output signal when a ratio between the outputs of the holding means and said lightdetector has become a fixed value, count means for counting pulses generated from said wavelength driving means in accordance with the wavelength scanning, on the basis of the output signal of said comparison means, means for discriminating a magnitude of the output of said lightdetector, and means for varying a magnitude of an input signal to the discrimination means on the basis of an output of said discrimination means.

* * * * *